US008728265B2

(12) United States Patent
Harris

(10) Patent No.: US 8,728,265 B2
(45) Date of Patent: May 20, 2014

(54) SKEG PROTECTOR APPARATUS AND METHOD OF MAKING

(75) Inventor: Courtney T. Harris, San Diego, CA (US)

(73) Assignee: Courtney T. Harris, San Diego, CA (US)

( * ) Notice: Subject to any disclaimer, the term of this patent is extended or adjusted under 35 U.S.C. 154(b) by 372 days.

(21) Appl. No.: 13/253,470

(22) Filed: Oct. 5, 2011

(65) Prior Publication Data
US 2013/0090027 A1    Apr. 11, 2013

(51) Int. Cl.
| | | |
|---|---|---|
| B29C 33/00 | (2006.01) | |
| B29C 35/02 | (2006.01) | |
| B29C 43/20 | (2006.01) | |
| B29C 43/52 | (2006.01) | |
| B29C 51/00 | (2006.01) | |
| B29C 51/02 | (2006.01) | |
| B29C 51/12 | (2006.01) | |
| B29C 51/14 | (2006.01) | |
| B29C 70/02 | (2006.01) | |
| B29C 70/28 | (2006.01) | |
| B29C 70/40 | (2006.01) | |
| B29C 70/48 | (2006.01) | |
| B63H 5/16 | (2006.01) | |
| B63H 20/34 | (2006.01) | |

(52) U.S. Cl.
USPC ........... 156/243; 156/245; 156/330; 264/258; 440/71

(58) Field of Classification Search
USPC ........... 440/71, 72; 416/247 A; 264/241, 257, 264/258; 156/242, 243, 245, 304.6, 307.1, 156/307.3, 325, 330, 583.1
See application file for complete search history.

(56) References Cited

U.S. PATENT DOCUMENTS

| | | | | |
|---|---|---|---|---|
| 4,824,507 | A * | 4/1989 | D'Amico | 156/245 |
| 5,007,869 | A * | 4/1991 | Zoellner | 440/71 |
| 5,018,997 | A | 5/1991 | Guptill | |
| D331,089 | S | 11/1992 | Monical | |
| 5,178,565 | A | 1/1993 | Jacobson | |
| 5,277,632 | A | 1/1994 | Davis | |
| D352,265 | S | 11/1994 | Haney et al. | |
| 5,362,546 | A * | 11/1994 | Boulanger | 428/138 |
| 5,643,023 | A | 7/1997 | Sober | |
| 6,168,483 | B1 * | 1/2001 | McIntosh | 440/71 |
| 6,503,110 | B2 | 1/2003 | Lammli | |
| D476,288 | S | 6/2003 | Higgins | |
| D497,141 | S | 10/2004 | Higgins | |
| 7,140,931 | B2 | 11/2006 | Norman et al. | |
| 7,270,584 | B1 | 9/2007 | Mitchell | |
| 7,363,872 | B1 | 4/2008 | Binger et al. | |
| 2006/0014446 | A1 | 1/2006 | Cox | |

OTHER PUBLICATIONS http://www.nextag.com/skeg/stores-html.
Co-pending design patent application: SkegProtector, http://skegprotector.com, Jan. 10, 2010, retrieved from http://web.archive.org/web/20100110063753/http://skegprotector.com/—see second photo in attached filed entitled "SkegExhibitC".

* cited by examiner

Primary Examiner — Ajay Vasudeva

(57) ABSTRACT

An apparatus and method of manufacturing a skeg protector to cover a motorboat skeg to prevent damage to the skeg and to the propellers. The SkegProtector™ apparatus is made of a composite of non-stainless steel woven material of high material strength and durability, such as carbon fiber, Kevlar®, fiberglass, titanium, and polyethylene fiber. It is affixed over the skeg using marine grade underwater adhesive, and without installing bolts or other mechanical means to secure it. Methods of manufacture comprise the use of curing using a heated platen press on aluminum molds encasing multiple layers (7) of woven material and a mandrel.

10 Claims, 3 Drawing Sheets

SKEG PROTECTOR APPARATUS AND METHOD OF MAKING

FIELD OF THE INVENTION

The present invention relates to boat motors/engines and more particularly to the protection of skegs on outboard and inboard-outboard motors, and the method of making a skeg comprising lightweight, high durability material.

BACKGROUND

The skeg of a boat motor is a fin that extends vertically down from the propeller shaft housing to protect the propeller blades, especially while they are rotating (See FIG. 2). Skegs can be severely damaged by impact with solid objects beneath the water surface (e.g. rocks); or boat ramps, and they can be worn down by shallow water dirt, mud, silt and drag forces generated by the water as the boat operates at high speeds. A damaged skeg must be replaced, which can be costly in time and in money for parts and labor.

The prior art discloses skeg shields of various compositions and configurations, wherein some cover only the leading edge of the skeg (e.g. U.S. Pat. No. 5,018,997 by Guptill, Brian); or part of the engine housing (e.g. U.S. Pat. No. 6,503,110 by Lammli, Ernest). Most of these devices are generally made of stainless steel and/or composite plastic material. For example, the SkegShield™ Skeg Guard and the Panther Marine Tech Safe Skeg Protector are made from marine-grade stainless steel. This makes the skeg shield extremely heavy, thus adding to the boat drag and to the difficulty in replacing or repairing the skeg.

These devices also generally require the use of mechanical modifications to affix the skeg guard to the skeg, such as drilling holes through the existing motor housing so that the guard can be affixed with bolts. These modifications will often void a manufacturer's warranty on the outboard motor and/or engine.

The objective of the present invention is to provide a lightweight skeg protector of superior wear resistance, material strength and durability, so as to better withstand impact and prevent damage to a skeg and the engine. It is a further object of the invention for the skeg protector to be quickly installed and without requiring mechanical alterations (e.g. drilling and installing bolts) to the outboard motor.

SUMMARY

The present invention comprises a skeg protector apparatus and method of making comprising materials of superior strength and durability, such as titanium, carbon fiber, Aramid Fiber, (including Kevlar®), fiberglass, and/or polyethylene fiber, or any combination thereof. In a preferred embodiment of the present invention, the skep protector comprises (from surface layer to interior): layers of carbon fiber, Kevlar®, and fiberglass, sandwiching a titanium leading edge. This skeg protector is thus about five times lighter in weight than comparable skeg protectors made of stainless steel. It also possesses superior material properties, such as enhanced abilities to withstand impact and wear resistance as compared to skeg protectors of the prior art.

The present invention further comprises methods of closed mold manufacturing of the skeg protector comprising steps of laying up and curing prepreg composite materials. The molds of aluminum molds using heated platen presses. The molds enclose layers of composite materials or fabrics comprising epoxy prepreg and resin content of about 35 to 45 percent, which under heating and pressure converts the fabric into solid material of sufficient mechanical strength and durability to withstand impact, shearing, and tensile forces exerted on skegs and propellers of motor boats. Additionally, the apparatus comprises no chrome plating, making it environmental friendly.

The present invention further comprises methods of using the skeg protector by installing it over an existing skeg (i.e. damaged) or as prevention from damage (like new skeg). In a preferred embodiment, the skeg protector is affixed using Marine Grade Underwater Adhesive, and without drilling holes for bolts or using other mechanical devices (i.e. screws, etc. . . . ). In an alternative embodiment, the skeg protector can be affixed using a bolt kit comprising two combination stainless steel bolts (male and female counterpart) and four knurled edge lock washers.

BRIEF DESCRIPTION OF THE DRAWINGS

In the accompanying drawings, which illustrate an exemplary embodiment of the present invention.

DETAILED DESCRIPTION

Figure 1:
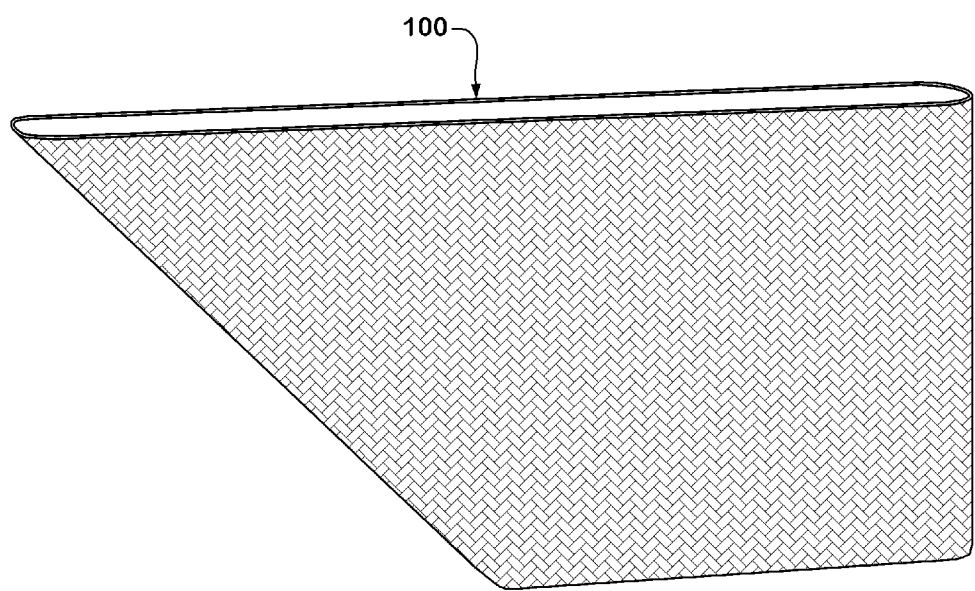
FIG. 1 illustrates perspective view of the skeg protector with a natural, unpainted surface texture.

The following definitions and methods are provided to better define the present invention and to guide those of ordinary skill in the art in the practice of the present invention. Unless otherwise noted, terms are to be understood according to conventional usage by those of ordinary skill in the relevant art.

As used herein, the term "curing" refers to a process of polymerization that is controlled through temperature, choice of resin and hardener compounds; and/or the ratio of resin to the hardener compounds. Some formulations benefit from heating during the cure period, whereas others simply require time, and ambient temperatures. The duration of a curing process varies depending upon materials used, and may take from minutes to hours.

As used herein, the term "Epoxy" refers to polyepoxide. It is a thermosetting polymer formed by reacting an epoxide "resin" compound with a polyamine "hardener" or activator. The resin consists of monomers or short chain polymers with an epoxide group at either end. Most common epoxy resins are produced from a reaction between epichlorohydrin and bisphenol-A. The hardener consists of polyamine monomers, for example triethylenetetramine (TETA). When these compounds are mixed together, the amine groups in the hardener react with the epoxide groups in the resin to form a covalent bond resulting in a cross-linked polymer that is rigid and strong.

As used herein, the term "mandrel" refers to an intensifier plug that is used during the molding process to prevent the sides of the skeg protector from collapsing inward until the material cures. It is placed inside of the skeg protector's two halves as they are adjoined together. The mandrel in the present invention also functions to exert pressure on the resin in the skeg protector fabrics so as to fill all of the weaves (e.g. surface area) in the material; and the ensure that the fabrics laminate together during the curing process.

As used herein, the term "motorized boat" refers to a boat utilizing means for propulsion comprising a motor, an engine, a hybrid motor/engine, and an electric motor. Throughout this disclosure, the terms "motor" and "engine" are interchangeable, and thus denote the same structural relationship to the skeg, and the skeg protector of the present invention.

As used herein, the term "prepreg" refers to a fabric comprising composite fibers pre-impregnated with resin, wherein the fibers are normally in a weave or unidirectional surface texture or pattern. The fabric is cured via exposure to high temperatures (as opposed to hot injection molding) to mold it into a solid material.

Shape and Dimensions:

The present invention may comprise the use of layers of fabric material with a percentage of epoxy resins and polyester resins, or both. In a preferred embodiment of the present invention, the fabrics are made from about 35 to 45 percent epoxy prepreg resin. Sheets of the fabric material are placed as layers within a mold and cured so as to form a solid, but hollow structure.

Figure 2:
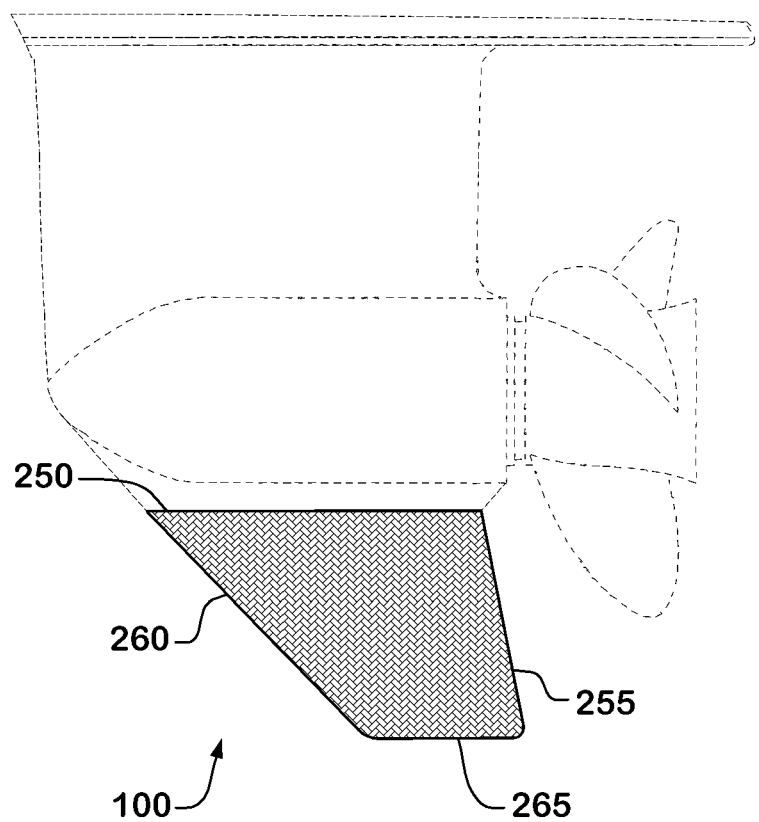
FIG. 2 illustrates a side view of the skeg protector covering the skeg, and suspended beneath a motor boat propeller (shown in dotted lines)

The skeg protector of the present invention is a hollow, trapezoid shaped device that covers and/or replaces a skeg on a motor boat (See FIGS. 1 and 2). The bottom edge (FIG. 2, 265), the trailing edge 255, and the leading edge 260 are sealed via curing, and are completely air tight and water proof. The top edge of the skeg protector 250 (which borders the engine's gear case) is open so as to slide the device over the existing skeg, wherein there is minimal clearance space between the skeg and the skeg protector. The leading edge 260 is placed at an angel of about 30 to 40 degrees to the top edge so as to minimize the drag as the boat moves through the water. The dimensions of the skeg protector depend upon the model of motor boat skeg. In the exemplification in FIG. 2: the top edge 250 is 14.156 inches; the bottom edge 265 is 6.94 inches; the leading edge side 260 is 11.322 inches; the trailing edge 255 is 6.486 inches, and the thickness is 0.53 inches.

Material Composition:

It may comprise the appearance of a patterned surface, such as a carbon fiber weave (See FIGS. 1 & 2, 100) with a smooth laminated like texture, or a smooth painted surface. The skeg protector may, by way of exemplification, be made from at least one or more layers of the following prepreg materials, or any combination thereof: carbon fiber weave, fiberglass, polyethylene fiber, and aramid fiber (e.g. Kevlar®). The fabrics may be non-woven or woven or patterned; such as plain, twill, Satin, 4HS, or 5HS weave fabrics. In plain weave fabrics, the warp and fill threads cross alternately. In a satin weave, one filling yarn floats over three to seven other warp threads before being stitched under another warp thread. And twill weave comprises passing the weft thread over one or more warp threads and then under two or more warp threads and so on, with a "step" or offset between rows to create the characteristic diagonal pattern. The skeg protector may also comprise hybrid fabrics, such as a Kevlar®/carbon fiber hybrid fabric.

Furthermore, the skeg protector may comprise woven or non-woven prepreg fabrics or materials wherein the pattern, direction, or weave of the different layers of fabric are laid at an angle, such as 90 degree angle orientation, to the fabrics in juxtaposition to each layer. The fabric's fibers may be aligned and bonded into sheets, which when layered at various angles to each other to give the resulting composite material strength in all directions—tension, compression, shear, stiffness and resiliency.

Types of carbon fiber suitable for use with the present invention are those exhibiting high flexibility, high tensile strength, low weight, high resistance, high temperature tolerance and low thermal expansion. The carbon fibers may also be used in alone in a fabric or may be combined with other materials to form a composite. For example, carbon fiber may be combined with graphite to form a carbon-carbon composite; or combined with plastic resin and molded or wound to form carbon fiber reinforced plastic, which possesses a very high strength-to-weight ratio and is extremely rigid. By way of exemplification, the a carbon fiber material suitable for use in the present invention may comprise the Rook, Grandmaster, Wasp, Labyrinth, Atomic, Roswell, or unidirectional carbon fiber fabrics manufactured by Fibre Glast Developments Corporation. Additionally, brands of carbon fiber suitable for use in the present invention comprise: Aldila, Hexcel, Tencate, De-Comp, JD Lincoln, APCM, Newport Adhesives and Composites, Dupont, and Franklin.

Fiberglass is a fiber reinforced polymer made of a plastic matrix, such as epoxy, reinforced by fine fibers of glass. It is a lightweight, extremely strong, and robust material that is easily formed using molding processes as in the present invention. It is also known as GFK (for Glasfaserverstärkter Kunststoff), glass-reinforced plastic (GRP), or glass fiber-reinforced plastic (GFRP). Types of fiberglass suitable for use with the present invention are Aldila, Hexcel, Tencate, De-Comp, JD Lincoln, APCM, Newport Adhesives and Composites, Dupont, and Franklin.

Aramid fiber is a manufactured fiber in which the fiber-forming substance is a long-chain synthetic aromatic polyamide wherein at least 85% of the amide groups are attached directly to two aromatic rings. The fibers are a class of heat-resistant and strong synthetic fibers with their chain molecules oriented along the fiber axis. In a preferred embodiment of the present invention, a type of para-aramid fiber known as Kevlar®, is used as one of the layers of materials within the skeg protector. Types of aramid manufacturers suitable for use with the present invention are also Aldila, Hexcel, Tencate, De-Comp, JD Lincoln, APCM, Newport Adhesives and Composites, and Dupont.

Multiple types of polyethylene are suitable for use in the present invention. High Molecular Weight Polyethylene (HMWP) is about 10 times stronger than steel and up to 40 percent stronger than aramids, and possesses the ability to float, and to resist chemicals and water. Ultra-high-molecular-weight polyethylene (UHMWPE or UHMW), also known as high-modulus polyethylene (HMPE) or high-performance polyethylene (HPPE), is a subset of the thermoplastic polyethylene. It is highly resistant to corrosive chemicals; has extremely low moisture absorption and a very low coefficient of friction; is self-lubricating; and is highly resistant to abrasion, in some forms being 15 times more resistant to abrasion than carbon steel. It also possesses strength-to-weight ratios about 10 to 100 times higher than steel; and 40% higher than aramids. By way of exemplification, types of polyethylene suitable for use with the present invention are produced by Honeywell Advanced Fibers & Composites, DSM Dyneema LLC, Nycon, Dupont, Acme Plastics, Inc., Interstate Plastics, Plastic Supply & Fabrication, Inc., and Boedeker Plastics, Inc.

The skeg protector may further comprise an additional layer, or part of a layer, comprising metal wire to strengthen the leading edge for further protection against impact from debris and rocks. In a preferred embodiment, the metal wire is titanium 60 by 60 woven wire mesh of about one inch width and length equal to the leading edge of the skeg protector. It is placed along the leading edge and between layers of fabric, such as between the two layers of Kevlar®. Titanium metal is of superior tensile strength as compared to steel and stainless steel, and thus enhances the ability of the skeg protector to withstand impact damage.

In a preferred embodiment of the present invention, the skeg protector comprises the following layers of fabric from the inside to the surface: 3 layers of fiberglass, 2 layers of Kevlar®, and 2 layers of standard carbon fiber twill weave; with a one inch wide strip of titanium woven wire mesh running along the leading edge and laying between the two layers of Kevlar®. The fiberglass comprises an epoxy prepreg @ 38% resin content. The Kevlar® and carbon fiber comprise an epoxy prepreg @ 42% resin content. Each layer of material is placed at a 90 degree orientation to the layers juxtaposed (i.e. on either side) to it.

Methods of Making

Molds and Mandrel:

The present invention comprises the use of metal molds for placing fabrics within and curing at high temperatures to transform the fabrics into a solid material composite skeg protector with a hollow interior. Therefore, the molds must comprise metal materials able to withstand temperatures ranging from room temperature up to 270 degrees Fahrenheit without warping, such as aluminum.

Each mold comprises two mirrored halves with cavity dimensions matching the surface size of the skeg of a specific motor boat engine manufacturer and model. Additionally, the mold size can be custom made per the client's needs. The depth of the cavities of the molds are about 0.25 inches, and the dimensions of the trapezoid are in accordance with skeg type (i.e. manufacture and model) for which the protector is being made. The final product is about 0.56 inches in outer diameter (outer edge-to-outer edge), with an inner diameter of about 0.375 inches to 0.438 inches, that is dependent upon the manufacturer and model of the skeg the is being covered.

Sheets of fabric (e.g. carbon fiber, Kevlar, and fiberglass) are laid within each of the two cavities, one on top of the other. Each mold half comprises the same layers of fabrics. Once the fabrics are in place, a mandrel, otherwise known as an intensifier plug, is placed over the fabrics in one mold half, then the second mold half is placed over it so as to produce a closed mold with the mandrel in the middle.

Mandrels are pre-fabricated before manufacturing a particular skeg protector, wherein each mandrel is solidified using molds of the same size (or are the same molds) as used for the specific protector to be made. It is also imperative that the mandrel be of the correct size and thickness to prevent defects in the skeg protector. The purpose of the mandrel once it is placed within the mold of a particular skeg protector that is being cured, is to expand under heat and exert internal pressure on the prepreg protector composite fabrics so that they will laminate together while the resin in the fabrics cure. The mandrel also prevents the fabrics from collapsing inward so as to ensure the skeg protector is hollow while also clearance (e.g. about 5%) to snuggly fit over the original skeg. If the mandrel is too thick, it will apply too much pressure on the fabrics and the prepreg resin will drain out of the mold cavities resulting in a skeg protector that is too dry. If the mandrel is too thin, it will not exert enough pressure on the fabrics, and the skeg protector will have pock marks or cavities because the resin was not pushed through all of the material weaves.

Mandrel manufacturing: the mold is heated to about 100 to 110 degrees Fahrenheit; the mold cavities are sprayed with an adhesive; sheet wax is placed over the cavities so that there is no overhang; the mold halves are joined and clamped together; a composition of 1 part catalyst to 10 parts silicone (e.g. SILASTIC® J RTV SILICONE RUBBER BASE & CURING AGENT manufactured by Dow Corning) is stirred together in a container (e.g. 75 g catalyst with 750 g liquid silicone); bubbles are manually removed from composition; composition is poured into the mold along the inner side of the leading edge; bubbles are manually removed from the composition within the mold; mandrel is left to cure at room temperature for about 24 hours. The mandrel may subsequently be used for up to about 50 different manufacturing procedures, of until it presents with a whitish color.

Part Layup

The two halves of the skeg protector are first created by placing layers of fabrics within the mold cavities, wherein the first layer placed will be the outside surface of the protector and the last layer placed will be the inner surface that contacts the original boat skeg. The size of the fabrics used in the two halves are of slightly different size so that when the halves are joined into one mold, the fabrics of one half overlaps the fabrics of the other half so as to form a tight seal along the seams. In a preferred embodiment of the present invention, the two sizes are: 12.5 inches by 8.5 inches; and 11.5 inches by 7.5 inches.

Figure 3:
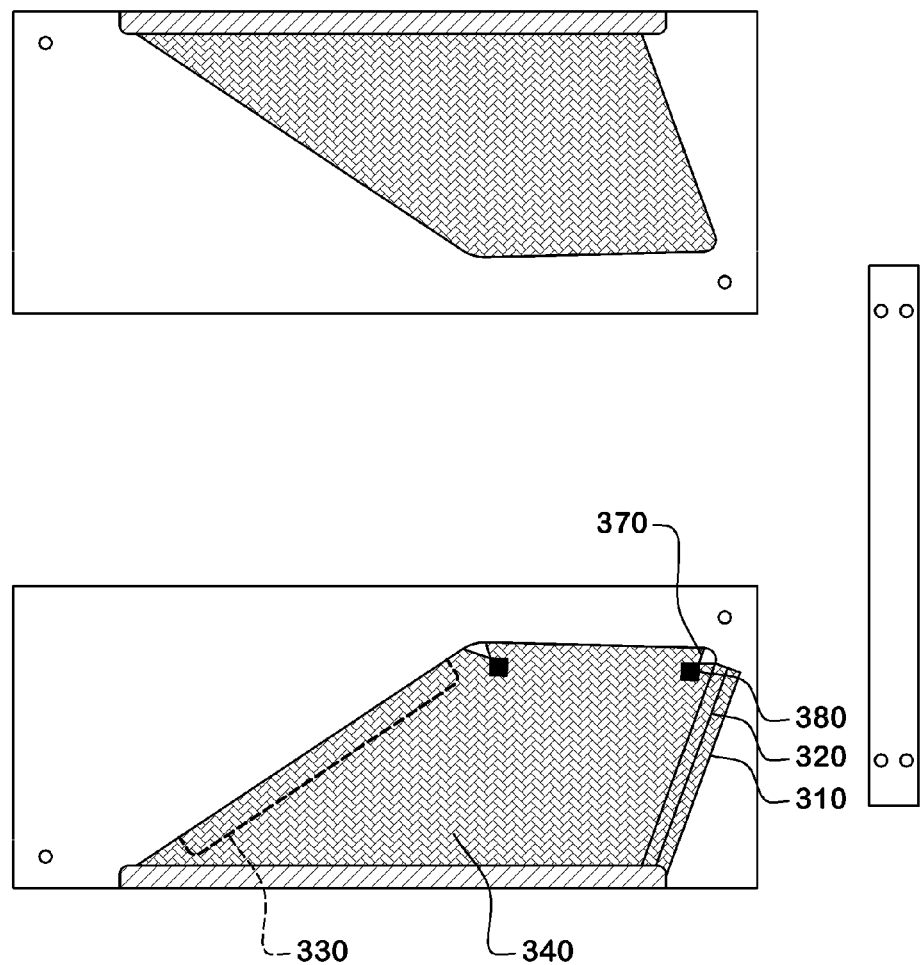
FIG. 3 illustrates a particular exemplification of a skeg protector mold set, wherein seven layers of three different types of material overlay the mold cavities.

The different layers of fabric are also at different angles of orientation to the layers lying to either side. The first layers of fabric are placed within the mold cavity such that the 0 degree axis of the material is along the long side of the mold plate (FIG. 3, 310). The second layer of material (e.g. also 310) is then placed at a 90 degree orientation to the first (underlying) layer 310, thus creating a woven fabric effect. The third layer of the mold, which may be the first layer of the second fabric 320 according to a preferred embodiment, is placed upon the second layer 310 at a 90 degree angle to it. In a preferred embodiment, the first fabric 310 is carbon fiber epoxy prepreg with 42 percent resin content, and the second fabric 320 is Kevlar® epoxy prepreg with 42 percent resin content.

Upon the first layer of the second material 320 (e.g. Kevlar) is placed a strip of metal wire 330, such as titanium, of approximately one inch in width and about the length of the leading edge 260. The length of wire 330 is placed flush with the leading edge (FIG. 2, 260) for the purpose of providing enhanced material strength to the skeg protector to withstand impact forces. The second (top) layer of the second material 320 is placed on top of the wire 330 and the first layer of 320, such that it is oriented 90 degrees to the first (bottom) layer 320. Three layers of the third material 340 are placed upon the top layer of the second material 320 with each layer at a 90 degree orientation to the layer directly beneath it. In a preferred embodiment, the third material if fiberglass epoxy prepreg with 38 percent resin content.

As each layer of material 310, 320, and 340 are laid, all material buckling, wrinkles, etc. . . . are manually smoothed out, and the edges of the material are pressed to closely adhere to all surfaces and crevices within the mold cavities. All of the layers of materials are laid and cut such that about one inch overhangs to bottom edge 265, the leading edge 260, the trailing edge 255; while about 0.25 inches overhangs to top edge 250. After all of the layers are in place, a triangle 370 is cut out of both ends of the bottom edge 265. A carbon fiber patch 380 is placed over the innermost tip of the triangle 370 to prevent holes or thin spots in the material. A mandrel matching the size of the mold is placed within one cavity, and pressed so that the mandrel bottom edge, leading edge, and trialing edge are flush with the edges of the cavity. The second half of the mold is placed over the first and the plates are joined together, thus encasing the mandrel with layers of materials 310, 320, and 340 on both sides of the mandrel. The mold top edge is covered with a metal plate (e.g. a close out bar as shown in FIG. 3) and bolted to the molds, in order to keep the mandrel pushed inside as it expands when heated.

Pre-Heat Platen Press and Curing

In a preferred embodiment, the skeg protector is cured using a heated platen press. The press should be pre-heated to 180 degrees Fahrenheit, preferably while the skeg protector parts are assembled in the molds (see "Part Layup"). One or more molds is placed in the press and covered with a non-flammable blanket. The temperature and duration of cycles during the curing process is a function of type of prepreg material and resin content used in the fabrics. In the preferred embodiment of the present invention, the mold(s) are heated at 200 degrees Fahrenheit for about one hour; then at 230 degrees Fahrenheit for about one to one and one half hours; and then at 270 degrees for about three hours. One of skill in the art would readily know of the temperatures and cycle durations for heat platen press curing using different materials, as well as alternative methods of curing (such as oven curing), and without engaging in undue experimentation.

De-Molding

The mold plates should be allowed to cool to about 100 degrees Fahrenheit before de-molding. The mold plates are opened by using an Allen wrench to remove the end plate screws or bolts. The molds are removed and the four edges of the protector are cleaned by manually removing any resin chards.

Mandrel Removal

The skeg protector with the mandrel is placed in a bench vice in an up-side-down position with the leading edge facing the User, and the mandrel extending about one inch from the protector's top edge and facing downward. This extension is also known as the "mandrel handle". The vice is clamped securely on opposing sides of the mandrel handle while not contacting the skeg protector. The mandrel is loosened from the protector by rocking the skeg protector in multiple directions. The skeg protector is then removed from the mandrel by the user pushing the protector's leading edge upward and backward off the mandrel. The skeg protector is further processed by cutting off the excess material of about one inch from the top edge (FIG. 3, 250). This may be done with a rotating drill, or by other methods known to one of ordinary skill in the art.

Methods of Painting

Skeg protectors of the present invention may be installed directly after the mandrel is removed, or they may be painted for appearance, such as to match the motor and/or engine. The painting process comprises: sanding the external surface of the protector, such as with 400 grit wet/dry sandpaper; cleaning; priming with a lacquer-based primer (e.g. Krylon by Sherwin Williams) wherein the primer color matches the paint color; and painting at least two coats. The primer is allowed to cure at air temperature for about 3 hours. The surface pits are then filled in with styrene putty that upon drying is sanded. Preferred types of paint are selected from the group consisting of aluminum paint (e.g. Krylon® and Dupli-Color®), military paint (e.g. Floquil®), and polyurethane paint. After the final coat of paint is applied, the protector is left to dry from about 24 to 48 hours depending on temperature and levels of humidity, before installing on the engine.

Methods of Installing/Using

The existing skeg must be straightened and its surface sanded with, for example, 80 grit sandpaper, and it must have at least 2 to 3 inches in length remaining for the skeg protector to bond to it. The clearance of the protector over the skeg is checked by tapping the protector into place over the skeg, and then removed. Masking tape is placed over motor parts that may be damaged by contact with the protector's adhesive (e.g. drain screw on the drive) and along the top edge of the skeg protector. The cavity of the protector is filled completely with marine grade adhesive, which may require the use of hand tools, such as knives to forcefully expand the cavity. The skeg protector is then placed over the skeg, and the top edge sealed with the addition of more adhesive. The masking tape is removed, excess adhesive cleaned off, and duct tape placed around the skeg protector to the gear housing to secure it in position while the adhesive sets. It takes approximately 72 hours for the adhesive to cure in warm temperatures before the skeg protector can be submerged in water.

In alternative embodiments of the present invention, bolts may be used to further secure the skeg protector into place, although they are not required. Holes for the bolts must be drilled at least 0.5 inches below the protector's top edge to prevent it from fracturing. The holes are drilled slowly and carefully through both sides of the protector and the existing skeg using a one eight inch drill bit to first tap and drill the holes, then one quarter drill bit to complete it so that they fit one quarter inch diameter bolts. After the holes are drilled, the adhesive is added to the inside of the skeg protector. Once the protector is fitted over the skeg, the bolts are added and the adhesive is allowed to cure.

Although the invention has been described with reference to specific embodiments thereof, this description is not meant to be construed in a limiting sense. Various modifications of the disclosed embodiments, as well as alternate embodiments of the invention, such as the use of alternative fabric types and/or numbers and configurations of layers of fabric, will become apparent to persons skilled in the art upon reference to the description of the invention. It is therefore contemplated that such modifications can be made without departing from the spirit or scope of the present invention as defined.

What is claimed is:

1. A method of manufacturing a skeg protector apparatus for a boat skeg, comprising:
   (a) providing a plurality of different fabrics each having a plurality of layers, each said layer having a generally trapezoidal shape sized to substantially match a shape and size of the boat skeg;
   (b) heating an aluminum mold to about 100 to 110 degrees Fahrenheit, wherein said mold comprises two mirrored halves, each with a cavity matching the shape and size of the boat skeg;
   (c) placing the plurality of layers of said different fabrics within each cavity of the two halves of the mold;
   (d) placing a mandrel atop the layers, wherein said mandrel lies flush against the sides of the cavity;
   (e) joining the two halves of the mold and securing said halves together;
   (f) heating the mold in a pre-heated platen press until said layers of the fabrics are cured into a solid, hollow apparatus comprising three enclosed sides; and
   (g) removing the mold and the mandrel from said apparatus;
   wherein said different fabrics are made of material selected from a group consisting of carbon fiber, aramid fiber, fiberglass, polyethylene fiber, titanium, and combinations thereof.

2. The method of claim 1, wherein said different fabrics are selected from the group consisting of non-woven fabrics, plain weaves, twill weaves, and stain weaves, or combinations thereof.

3. The method of claim 1, wherein said plurality of layers of said different fabrics comprise a first layer, a second layer and a third layer, wherein the first layer is carbon fiber fabric, the second layer is aramid fiber fabric, and the third layer is fiberglass fabric.

4. The method of claim 3, wherein said different fabrics further comprise epoxy prepreg of about 35 to 45 percent resin content.

5. The method of claim 1, further comprising laying each said layer of fabric at a 90 degree orientation to the layer beneath it.

6. The method of claim 1, further comprising placing a layer of metal wire of about one inch width along the leading edge of each of the two cavities sandwiched between layers of said fabrics.

7. The method of claim 6, wherein said metal wire is titanium woven wire mesh.

8. The method of claim 1, wherein the mold is heated at about 200 degrees Fahrenheit for about one hour; then at about 230 degrees Fahrenheit for about one to one and one half hours; and then at about 270 degrees for about three hours.

9. The method of claim 1, wherein said mandrel expands under heat and exerts internal pressure on said fabrics during curing.

10. The method of claim 1, further comprising affixing said skeg protector apparatus over the boat skeg using marine grade underwater adhesive, and without installing bolts or other mechanical means to secure it.

* * * * *